United States Patent
Wiederin et al.

(10) Patent No.: US 11,692,912 B2
(45) Date of Patent: Jul. 4, 2023

(54) SYSTEM AND METHOD FOR TRAPPING FLUID AT A VALVE

(71) Applicant: Elemental Scientific, Inc., Omaha, NE (US)

(72) Inventors: Daniel R. Wiederin, Omaha, NE (US); Tyler Yost, Omaha, NE (US)

(73) Assignee: Elemental Scientific Inc., Omaha, NE (US)

( * ) Notice: Subject to any disclaimer, the term of this patent is extended or adjusted under 35 U.S.C. 154(b) by 357 days.

(21) Appl. No.: 17/012,883

(22) Filed: Sep. 4, 2020

(65) Prior Publication Data

US 2021/0072121 A1  Mar. 11, 2021

Related U.S. Application Data

(60) Provisional application No. 63/040,768, filed on Jun. 18, 2020, provisional application No. 62/897,023, filed on Sep. 6, 2019.

(51) Int. Cl.
- *G01N 1/20* (2006.01)
- *G01N 35/10* (2006.01)
- *G01N 1/22* (2006.01)

(52) U.S. Cl.
CPC ......... *G01N 1/2035* (2013.01); *G01N 1/2247* (2013.01); *G01N 35/1016* (2013.01); *G01N 2001/205* (2013.01)

(58) Field of Classification Search
CPC ..... B01L 3/0289; G01N 1/14; G01N 35/1016
See application file for complete search history.

(56) References Cited

U.S. PATENT DOCUMENTS

| | | | | |
|---|---|---|---|---|
| 3,645,142 A | * | 2/1972 | Turpin | G01N 1/38 422/561 |
| 3,901,087 A | * | 8/1975 | Fabritius | G01N 1/14 73/864.35 |
| 3,929,413 A | * | 12/1975 | Young | G01N 35/08 73/864.35 |
| 4,163,392 A | * | 8/1979 | Fleenor | G01N 35/1095 73/864.35 |
| 4,418,581 A | * | 12/1983 | Jones | G01N 1/14 73/864.34 |
| 5,197,340 A | * | 3/1993 | Jones | B01L 3/567 422/938 |

(Continued)

OTHER PUBLICATIONS

PCT International Search Report and Written Opinion for PCT/US2020/049465, dated Dec. 21, 2020.

*Primary Examiner* — David A. Rogers
(74) *Attorney, Agent, or Firm* — Kevin E. West; Advent, LLP

(57) ABSTRACT

Systems and methods are described for isolating a sample at a valve prior to introduction to an analysis system, such as sample analysis via ICP-MS. A system embodiment can include, but is not limited to, a valve system including a first valve in fluid communication with a sample reservoir and a second valve configured to permit and block access of a vacuum source to the first valve; a sensor system configured to detect presence or absence of a fluid at the first valve; and a controller configured to control operation of the second valve to block access of the vacuum source to the first valve upon detection of the fluid at the first valve to isolate the fluid within the sample reservoir.

18 Claims, 11 Drawing Sheets

(56) References Cited

U.S. PATENT DOCUMENTS

| | | | | |
|---|---|---|---|---|
| 5,396,812 | A * | 3/1995 | Peterson | G01N 1/14 |
| | | | | 73/863.25 |
| 5,433,120 | A * | 7/1995 | Boyd | G01N 1/2035 |
| | | | | 73/863.81 |
| 6,453,759 | B1 * | 9/2002 | Lebski | G01N 1/2035 |
| | | | | 73/863.02 |
| 7,413,710 | B2 * | 8/2008 | Lisec | B01L 3/0241 |
| | | | | 422/417 |
| 7,430,930 | B2 * | 10/2008 | Zeller | G01F 3/08 |
| | | | | 73/864.34 |
| 7,726,212 | B2 * | 6/2010 | Magnussen | B01L 3/0217 |
| | | | | 73/864.16 |
| 10,384,841 | B2 * | 8/2019 | Werbner | B65D 47/263 |
| 10,690,637 | B2 * | 6/2020 | Yasunaga | G01N 30/24 |
| 10,809,275 | B2 * | 10/2020 | Hurwitz | G06V 20/52 |
| 10,948,464 | B2 * | 3/2021 | Fujioka | G01N 30/86 |
| 2005/0123970 | A1 | 6/2005 | Ozbal et al. | |
| 2005/0124059 | A1 * | 6/2005 | Kureshy | G01N 35/1016 |
| | | | | 435/287.2 |
| 2016/0056028 | A1 | 2/2016 | Wiederin et al. | |
| 2016/0299041 | A1 | 10/2016 | Kertesz et al. | |
| 2017/0122914 | A1 | 5/2017 | Warner et al. | |
| 2018/0154349 | A1 * | 6/2018 | Habbal | B01L 3/0289 |
| 2018/0180639 | A1 | 6/2018 | Diaz et al. | |
| 2019/0368980 | A1 * | 12/2019 | Barmash | G01N 1/2035 |
| 2020/0330976 | A1 * | 10/2020 | Wikholm | G01N 35/1016 |

\* cited by examiner

SYSTEM AND METHOD FOR TRAPPING FLUID AT A VALVE

CROSS-REFERENCE TO RELATED APPLICATIONS

The present application claims the benefit of 35 U.S.C. § 119(e) of U.S. Provisional Application Ser. No. 62/897,023, filed Sep. 6, 2019, and titled "SYSTEM AND METHOD FOR TRAPPING FLUID AT A VALVE" and of U.S. Provisional Application Ser. No. 63/040,768, filed Jun. 18, 2020, and titled "SYSTEM AND METHOD FOR TRAPPING FLUID AT A VALVE." U.S. Provisional Application Ser. Nos. 62/897,023 and 63/040,768 are herein incorporated by reference in their entireties.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods are described for isolating a sample at a valve prior to introduction to an analysis system, such as for sample analysis via ICP-MS. A system embodiment can include, but is not limited to, a valve system including a first valve in fluid communication with a sample reservoir and a second valve configured to permit and block access of a vacuum source to the first valve; a sensor system configured to detect presence or absence of a fluid at the first valve; and a controller configured to control operation of the second valve to block access of the vacuum source to the first valve upon detection of the fluid at the first valve to isolate the fluid within the sample reservoir.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Figure 1:
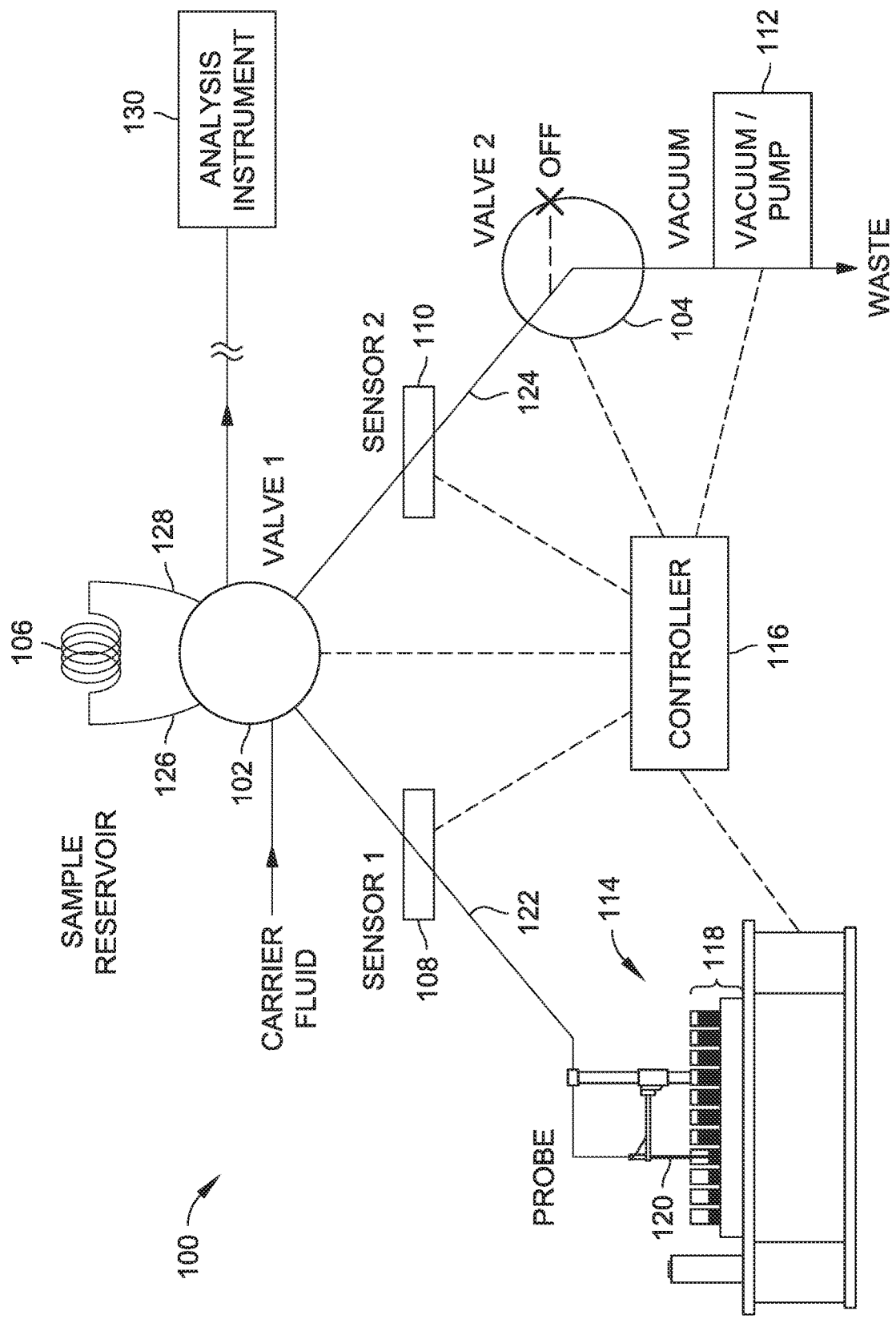
FIG. 1 is a diagrammatic illustration of a system for isolating a sample at an injection valve prior to analysis, in accordance with example implementations of the present disclosure.

Sample introduction systems can be employed to introduce liquid samples to analytic instrumentation for analysis, such as via inductively coupled plasma (ICP) spectrometry instrumentation. For example, pump systems, valve systems, and autosampling systems can deliver a sample from a sample source (e.g., a sample vial) through one or more valves and into a nebulizer for subsequent chemical component analysis by the ICP spectrometry instrumentation. When multiple samples are handled by such sample introduction systems, the throughput of the systems can be limited by a number of factors, such as transfer rates of samples through the fluid lines of the system, the ability of the system to recognize which sample has been drawn into the system through the autosampling system, the ability of the system to track which sample is introduced to the ICP spectrometry instrumentation, and the like. For example, biological samples can be provided for analysis in microtiter trays, where such trays can include hundreds of wells containing samples (e.g., 384 well microtiter plates or the like). Inefficiencies in sample handling or limitations in throughput of analyzing such samples are compounded through the process of handling each of the hundreds of samples, resulting in large potential time and monetary costs associated with processing the samples.

A valve injection system can be utilized to rapidly move an aliquot of a sample from a sample container and load it into a reservoir at a valve. The reservoir can be a length of tubing having a similar dimension or volume as the tube leading from the sample container to the valve. To speed sample loading, a pump system (e.g., a vacuum pump, syringe pump, etc.) can rapidly pull sample from the sample container (e.g., via a sample probe inside the sample container) and into the reservoir. However, such rapid loading of the sample presents challenges to high-throughput analyses of microvolume samples. For instance, the entire sample held in the sample container may be consumed during the rapid loading of the sample from the sample container into the reservoir or passed to the analysis instrumentation. If analysis results of the sample are questionable, or if the laboratory otherwise requires reanalysis of the sample to verify the results, consumption of the sample from the sample container would require a time-consuming re-preparation of the sample for verification analysis. Moreover, such systems can utilize basic timing considerations for when to move the autosampler or take up samples, where laboratory situations can negatively impact sample analysis under such timing considerations. For example, if a foreign body is introduced with a sample (e.g., a filter fiber, sediment, debris, etc.) or a foreign body interacts with the sample probe, or if an alteration in the system tubing occurs (e.g., bend or kink in the system tubing), the flow rate of fluids through the system can be slowed or otherwise altered, causing the timing to be negatively impacted (e.g., decreased uptake of sample, inaccurate analysis, etc.).

Accordingly, in one aspect, the present disclosure is directed to a high sample throughput system to isolate a precise amount of sample from a sample container to minimize sample consumption and allow enough sample remaining in the sample container to allow reanalysis if desired. For example, the system can include an injection valve in fluid communication with a vacuum source to draw sample into a sample reservoir at the injection valve. The system includes one or more sensors to detect the presence or absence of sample at the valve where the output of the sensor(s) can be used to control operation of a vacuum source or fluid access of a vacuum source to the injection valve to prevent drawing additional sample into the injection valve upon detection of the sample at the injection valve. In one aspect, the system includes a second valve in fluid communication with the injection valve to control or cut off vacuum applied to the injection valve and alter the flow of sample from the sample container to the injection valve. For example, when the sensor or sensors detect presence of the sample at the injection valve, the second valve stops the flow of sample from the sample container to preserve the volume of sample fluid within the sample container for reanalysis. In one aspect, the system includes a vacuum source that incorporates a valve that closes upon deactivation of the vacuum source when the sensor or sensors detect presence of the sample at the injection valve. Use of the sensor or sensors therefore accounts for actual sampling conditions as opposed to relying solely on estimated timing or standard time protocols. Alternatively or additionally, the output of the sensor(s) can be used to control positioning or orientation of a sample probe used to obtain the sample, such as by causing the sample probe to be lifted from the sample container upon detection of the sample at the injection valve.

Example Implementations

Referring generally to FIGS. 1 through 4, systems 100 are shown for isolating a sample at a valve prior to introduction to an analysis system. The system 100 generally includes a flowpath having a fluid flow controller that facilitates control of a vacuum applied to a fluid line in fluid communication with a fluid reservoir, where the controller utilizes sensor output(s) to determine when a sample or other fluid is present in the fluid reservoir. The system 100 shown in FIG. 1 includes a valve system (valves 102 and 104 are shown), a sample reservoir 106, a sensor system (sensors 108 and 110 are shown), a vacuum source 112, an autosampler 114, and a controller 116. The autosampler 114 introduces samples from a plurality of sample sources 118 through operation of the vacuum source 112 in fluid communication with the autosampler 114 via the valves 102 and 104. For example, the vacuum source 112 can include, but is not limited to, a syringe pump, a peristaltic pump, a piston pump, a vacuum, or the like to draw fluid through the system 100. The autosampler 114 includes a sample probe 120 to move between individual sample sources of the plurality of sample sources 118 (e.g., according to pre-programmed sampling protocols) to introduce a plurality of samples to the valve 102 via a transfer line 122. The plurality of sample sources 118 can include, but is not limited to, sample containers having small sample volumes (e.g., volume capacity less than one milliliter), such as microtiter wells (e.g., having a volume of approximately 150 µL), sample vials, or other containers. The valve 102 directs sample, rinse fluid, or other fluids received from the autosampler 114 via the transfer line 122 into the sample reservoir 106.

The sample reservoir 106 is sized and dimensioned to hold a precise and known amount of fluid (e.g., with a volume that can be utilized for analyte concentration determinations) and can include, but is not limited to, a coiled configuration of tubing, serpentine tubing configurations, linear tubing configurations, irregular tubing configurations, combinations thereof, or the like. In implementations, the sample reservoir 106 has a volume of less than about one milliliter (1 mL) to facilitate handling of microvolume samples by the system 100. For example, the sample reservoir 106 can have a volume of 50 µL, 100 µL, 150 µL, 200 µL, 250 µL, 300 µL, 350 µL, 400 µL, 450 µL, 500 µL, 550 µL, 600 µL, 650 µL, 700 µL, 750 µL, 800 µL, 850 µL, 900 µL, 950 µL, or a volume between about 5 µL and 1000 µL. The volume of the sample reservoir 106 can be at least half of a volume of a single sample to be analyzed by the system 100 such that at least two individual volumes of samples can be drawn from a single sample container 118 and transferred through the system 100 to fill the sample reservoir 106 (e.g., to provide sufficient sample available for reanalysis if desired). In implementations, the sample reservoir 106 includes an inlet 126 and an outlet 128, each coupled to the valve 102 (e.g., via two ports of the valve 102), such that the fluid flow configuration of the valve 102 manages the flow of fluid into and out of the sample reservoir 106. Alternatively or additionally, the valve 102 defines a fluid flow channel (e.g., in a valve stator portion) forming at least a portion of the sample reservoir 106. The valve 102 is configured to switch between valve orientations to provide fluid communication between the sample reservoir 106 and the valve 104 or between the sample reservoir 106 and an analysis instrument 130 (e.g., ICP spectrometry instrumentation) to permit transfer of fluid held in the sample reservoir 106 to the analysis instrument 130 or sample preparation system thereof (e.g., via introduction of a carrier fluid through the valve 102 and the sample reservoir 106 to push the fluid therefrom, shown in FIG. 1).

The controller 116 is operably coupled to components of the system 100 to facilitate coordination of drawing samples, rinse fluid, or other fluids into the sample reservoir 106, stopping the drawing of samples, rinse fluid, or other fluids from the autosampler 114, and introducing fluid held in the sample reservoir 106 for injection into analytic instrumentation. For example, the controller 116 can control operation of one or more of the autosampler 114, the valve 102, the valve 104, the vacuum source 112, and analytic instrumentation based on signals received from one or more of the sensor 108, the sensor 110, and the analytic instrumentation. Alternatively or additionally, the autosampler 114, the valve 102, the valve 104, the vacuum source 112, and analytic instrumentation can include local controllers having functionality coordinated amongst the components of the system 100.

Figure 2A:
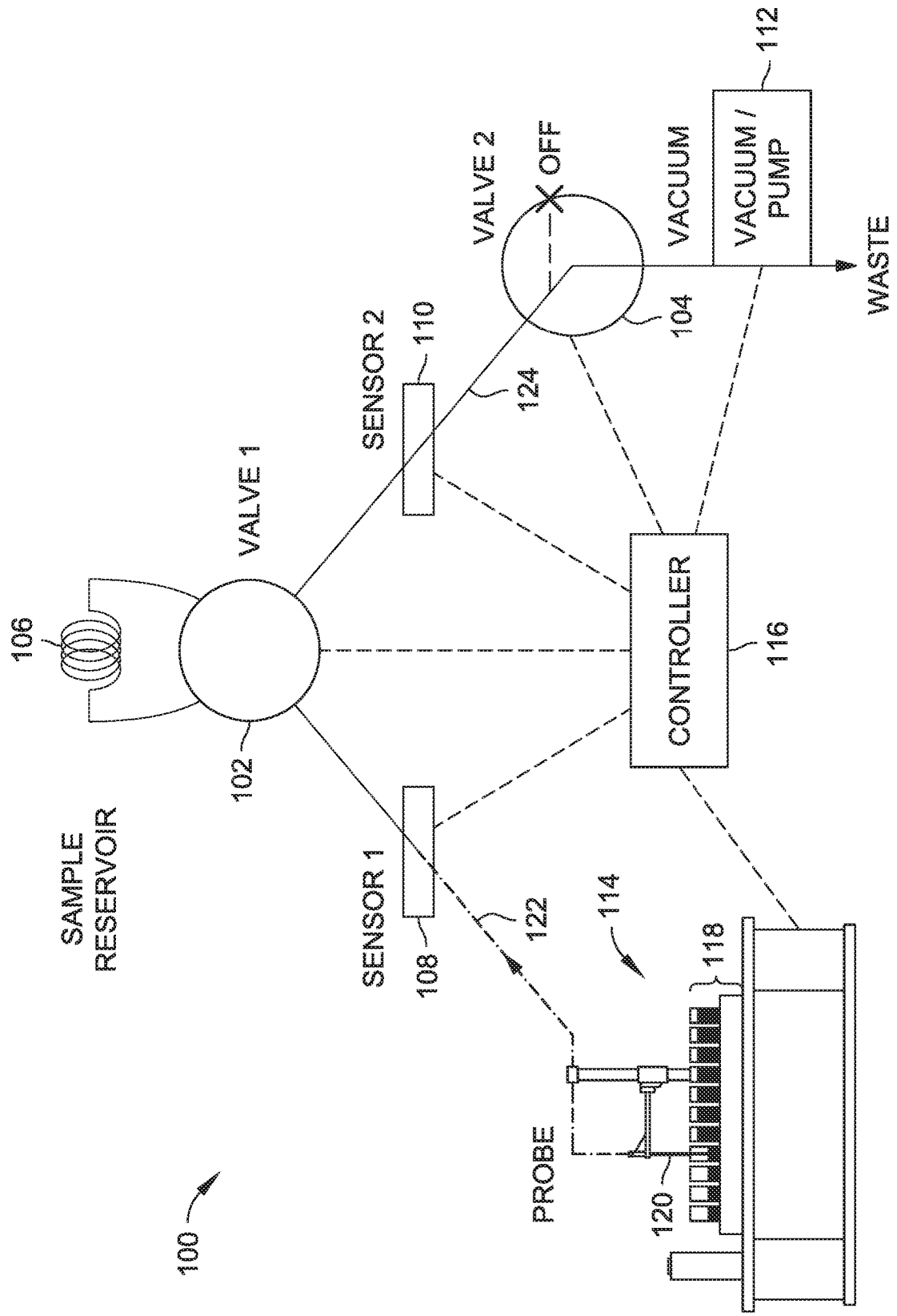
FIG. 2A is a diagrammatic illustration of the system of FIG. 1 beginning to draw sample from a sample container for transfer to an injection valve.
Figure 2B:
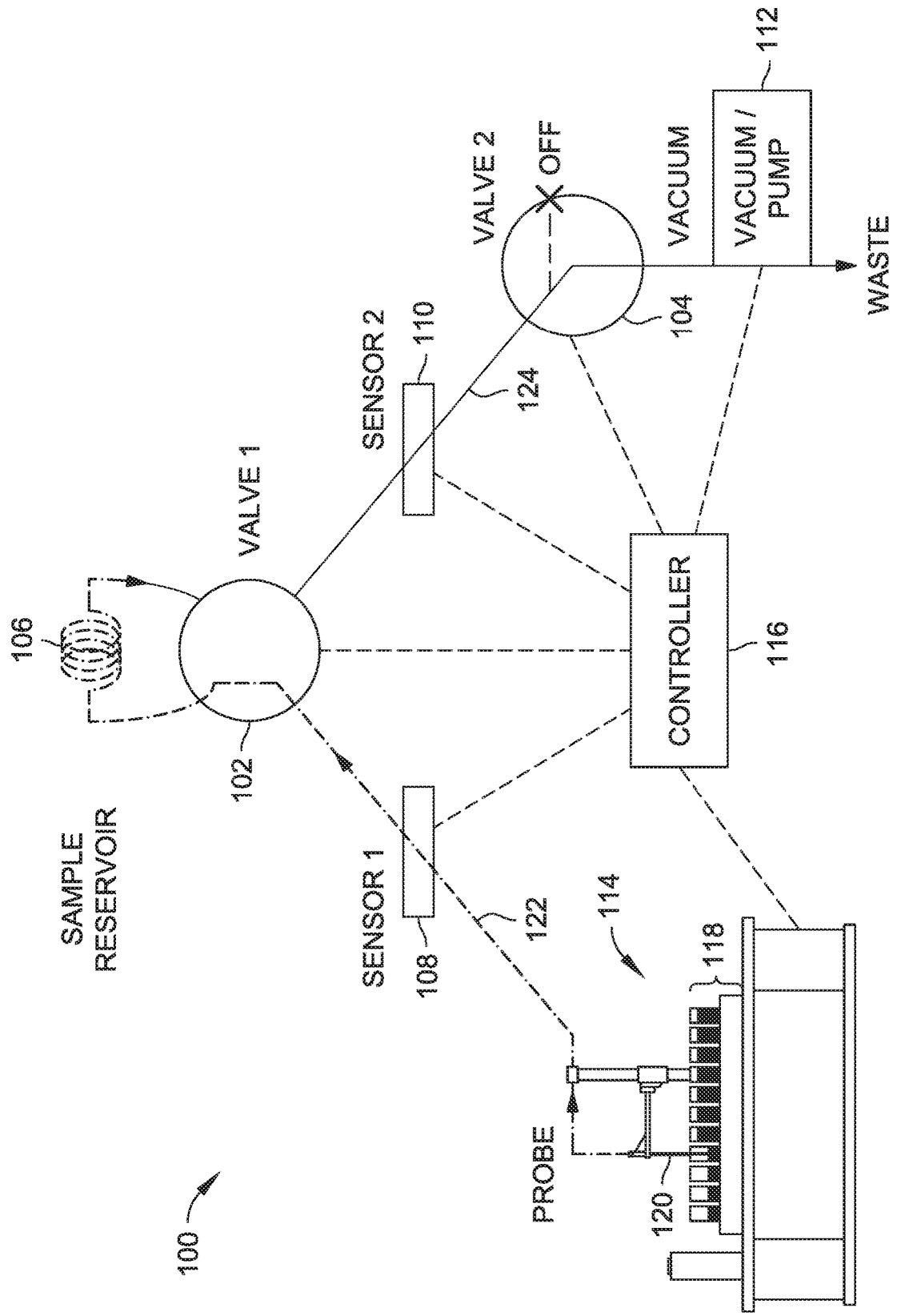
FIG. 2B is a diagrammatic illustration of the system of FIG. 2A with the sample reaching a second sensor of the injection valve.

An example sample transfer implementation of the system 100 is described with reference to FIGS. 2A through 2C. As shown in FIG. 2A, the vacuum source 112 is in fluid communication with the probe 120 of the autosampler 114 via the valve 104, the valve 102, and the sample reservoir 106. The probe 120 is introduced to a sample container 118 and the vacuum source 112 applies a vacuum to a fluid line 124 coupled between the valve 104 and the valve 102 to draw sample from the sample container 118 into the transfer line 122. Alternatively, the vacuum source 112 can be positioned between the sensor 110 and the valve 104, where the valve 104 can control access of the vacuum source 112 to an outlet for fluid during operation to provide the vacuum to the fluid line 124. The sensor 108 is positioned adjacent or about the transfer line 122 to detect a presence or absence of fluid within the transfer line 122. For example, the leading edge of the sample transferred through the transfer line 122 is detected by the sensor 108 and a sense signal is generated accordingly. The sensor system can employ one or more optical sensors, pressure sensors, ultrasonic transducers, conductivity sensors, or other sensors, and combinations thereof to detect the presence or absence of fluid within the transfer line 122, the fluid line 124, or other portion of the system 100. In implementations, the sensor 108 transmits the sense signal to the controller 116 to indicate presence of the sample within the transfer line 122. Referring to FIG. 2B, the sample is further drawn through the transfer line 122 and directed into the sample reservoir 106 via the valve 102.

Figure 2C:
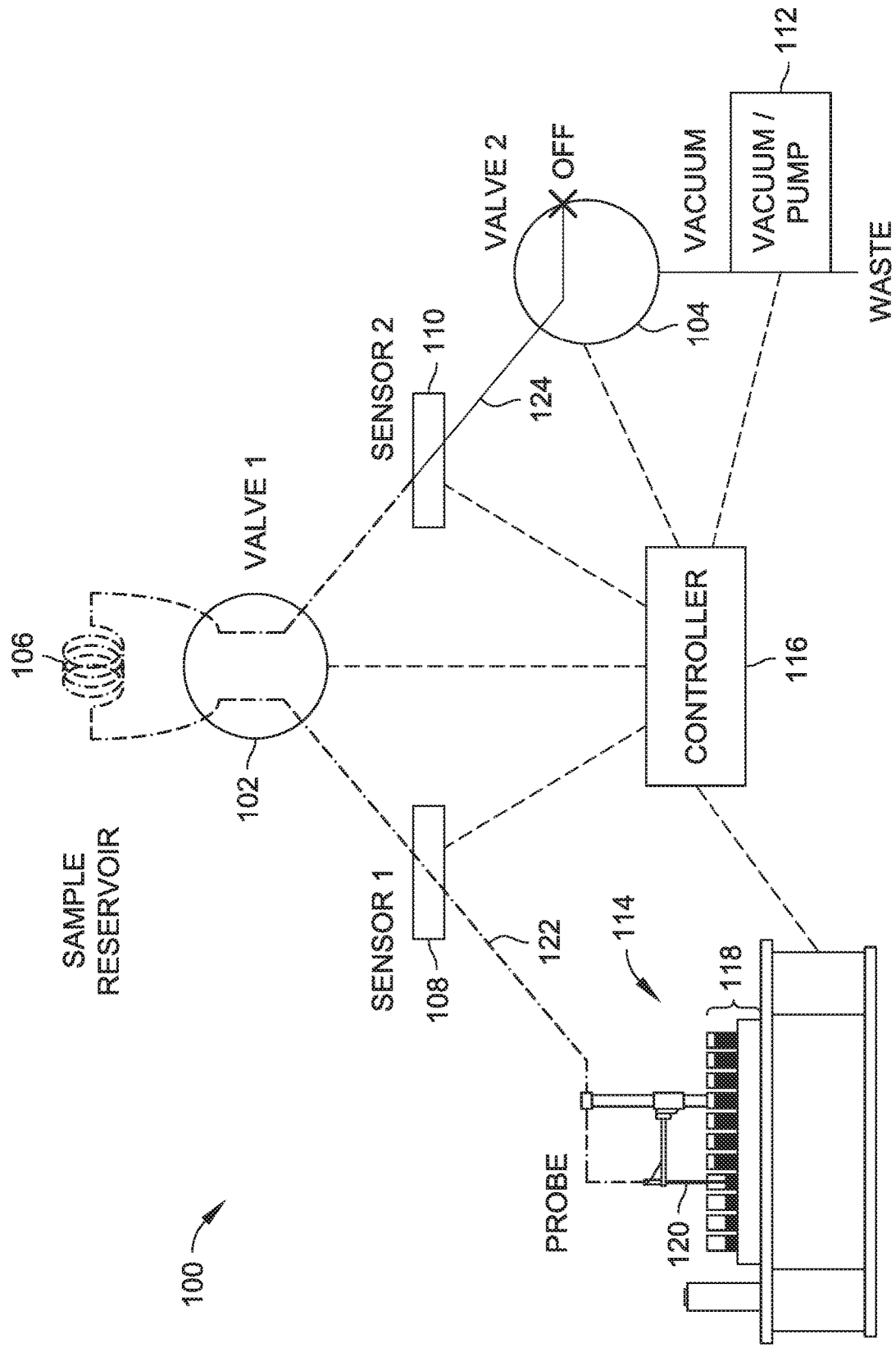
FIG. 2C is a diagrammatic illustration of the system of FIG. 2B with a second valve closing access between a vacuum source and the injection valve to isolate the sample within a sample reservoir.

Referring to FIG. 2C, the valve 102 further directs the sample from the sample reservoir 106 into the fluid line 124 upon filling of the sample reservoir 106. The sensor 110 is positioned adjacent or about the fluid line 124 to detect a presence or absence of fluid within the fluid line 124 as the fluid leaves the valve 102. For example, the leading edge of the sample transferred out of the valve 102 and into the fluid line 124 is detected by the sensor 110 and a sense signal is generated accordingly. In implementations, the sensor 110 transmits the sense signal to the controller 116 to indicate presence of the sample within the fluid line 124. In implementations, the volume of fluid lines between the autosampler 114 and the second 110 is less than half of the volume of one sample container of the plurality of sample containers 118 present at the autosampler 114 such that at least two volumes of samples can be drawn from a single sample container and transferred through the system 100 to fill the sample reservoir 106.

In implementations, when the sensor 110 detects the presence of the sample within the fluid line 124, the resulting sense signal causes the controller 116 or other control device to change the flow path configuration of the valve 104 to control or cut off the vacuum applied by the vacuum source 112. The valve 102 can include a rotary valve switchable between positions (e.g., under control by the controller 116, a local controller, or combinations thereof). For example, the valve 104 is transitioned from a first flow configuration (e.g., shown in FIGS. 2A and 2B) where a flow path extends between sample probe 120 and the vacuum source 112 (e.g., via the transfer line 122, the valve 102, the sample reservoir 106, the fluid line 124, and the valve 104) to a blocked flow configuration (e.g., shown in FIG. 2C) to stop action of the vacuum source 112 from affecting the sample within the fluid line 124, the sample reservoir 106, or the transfer line 122. When the valve 104 is in the blocked flow configuration, the sample probe 120 no longer draws sample from the sample container 118. Accordingly, the system 100 controls the amount of fluid removed from the sample containers 118 by trapping fluid at the valve 102 substantially simultaneously with detecting the presence of the fluid with the sensor system. The sensor system accounts for actual conditions of the system 100 during operation, including real time flow conditions of fluids through the system 100, which can therefore properly capture the precise amount of fluid at the valve 102 (e.g., the entire volume of the sample reservoir 106) without relying on estimated flow rates or preset timing operations between fluid draw from the sample container to switching flow configurations at the valve 102 to capture the fluid at the sample reservoir 106. For example, if the system 100 has an alteration in the fluid flow from ideal flow conditions, such as if a foreign body is introduced with a sample (e.g., a filter fiber, sediment, debris, etc.) or if a foreign body interacts with the sample probe, or if an alteration in the system tubing occurs (e.g., bend or kink in the system tubing), the system 100 adjusts for the reduction in flow rate by utilizing the sensor system to trigger when the valve 102 is switched between flow configurations to capture the fluid within the sample reservoir 106. If mere preset timing operations were utilized, there is a risk that a decreased flow rate would not provide sufficient fluid to fill the sample reservoir 106 before the preset timing limited flow of the sample draw, which could result in decreased uptake of sample (e.g., an underfilled sample reservoir 106), inaccurate analysis (e.g., based on unknown volume of sample present in the sample reservoir 106), or other detriment to sample analysis.

Figure 2D:
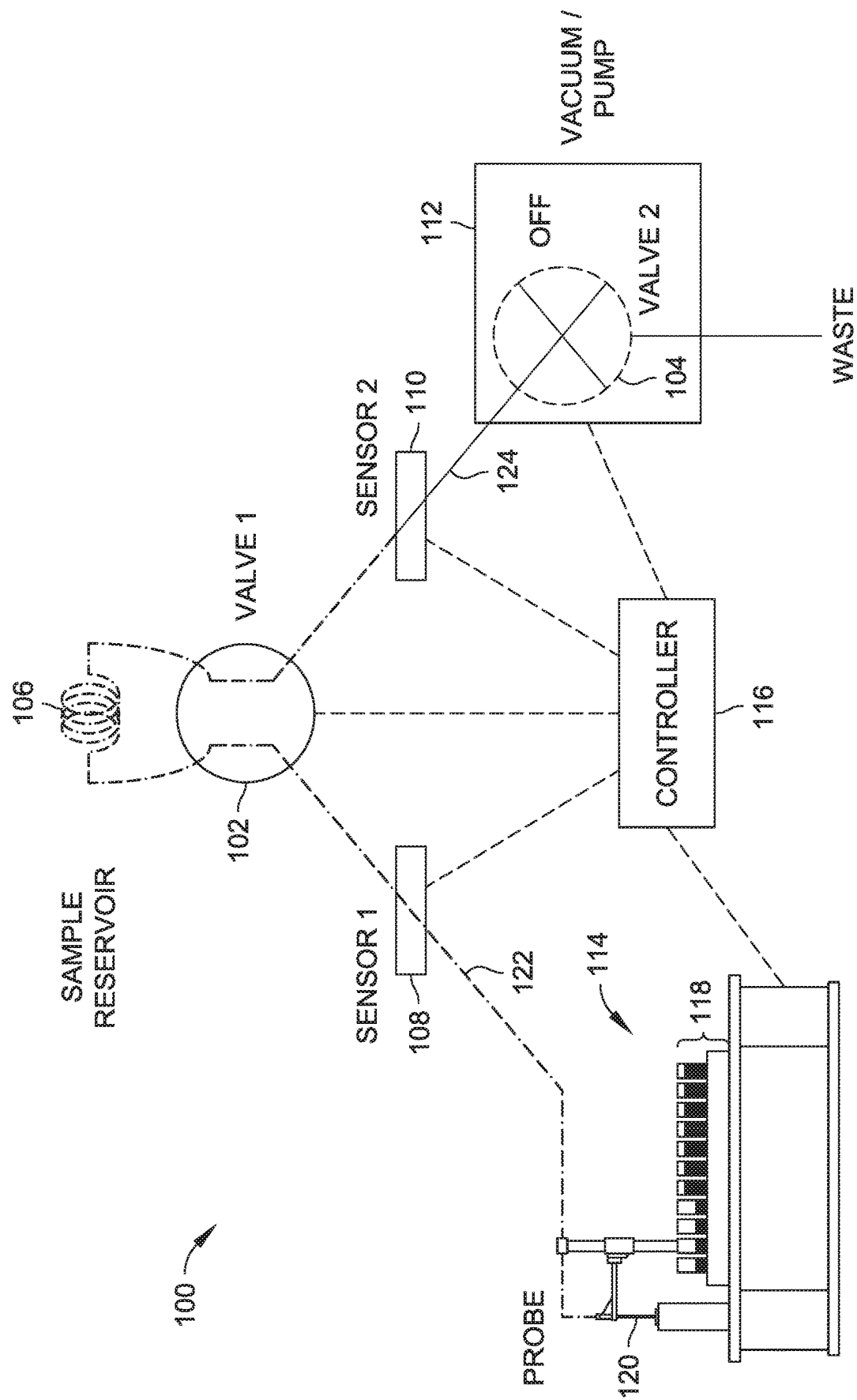
FIG. 2D is a diagrammatic illustration of a system for isolating a sample at an injection valve prior to analysis, in accordance with example implementations of the present disclosure.

In an implementation of the system 100 shown in FIG. 2D, the system 100 controls application of a vacuum to the fluid line 124 through control of the vacuum source 112 by the controller 116. For example, in one aspect, the vacuum source 112 can include a pump configured to stop generating a vacuum (e.g., a piston pump) to cease application of a vacuum to the fluid line 124 subsequent to receiving control signals from the controller 116 upon detection of the sample within the sample reservoir (e.g., via sense signals generated from the sensor 110). In an aspect, the vacuum source 112 includes a valve (e.g., valve 104) as a component of the vacuum source 112, where control of the vacuum source 112 by the controller 116 influences the operation of the valve within the vacuum source 112. For example, the valve within the vacuum source 112 can be a check valve, solenoid valve, a pinch valve, or other valve that biases to a closed position upon stoppage of flow of fluid through the vacuum source 112, upon loss of power of the vacuum source 112, or the like, to prevent access of a fluid outlet by the vacuum source 112. In such a configuration, the valve permits fluid flow through the vacuum source 112 as the vacuum source 112 is permitted to operate by the controller 116 and stops fluid flow through the vacuum source 112 when the controller 116 ceases operation of the vacuum source 112 (e.g., upon detection of sample within the sample reservoir 106).

In implementations, the controller 116 or other control device controls operation of the autosampler 114 to remove the probe 120 from the sample container 118 when the sample or other fluid is detected at the valve 102 by the sensor system in addition to, or as an alternative to, control of operation of the vacuum source 112 or control of fluid coupling between the vacuum source 112 and the probe 120. For example, when the probe 120 is removed from the sample container 118, the system 100 prevents additional sample from being introduced to the valve 102, even if the vacuum is still applied to the transfer line 124 (such as if a lag time occurs between vacuum shutoff and lack of vacuum applied to the transfer line 124). If the vacuum is still applied to the transfer line 124 while the probe 120 is removed from the sample container 118, ambient gas instead is introduced to the transfer line 124. In implementations, the valve 104 is omitted from the system 100 when the probe 120 is retracted or otherwise removed from the sample container 118 based on detection of the fluid at the valve 102 by the sensor system.

Precise control of the vacuum source 112, the probe 120, and combinations thereof, as described herein can reduce the amount of fluid drawn from the sample container 118 in order to fill the sample reservoir 106, which can preserve sample in the sample container 118 following the removal of a fluid from the sample container 118 for subsequent reanalysis. For small volume sample containers 118 or small volumes of fluid present in the sample containers 118, if too much fluid is removed to guarantee a filled sample reservoir 106, such as if significant amounts of fluid flow past the sensor 110 before the valve 102 is switched (such as could be the case with preset timing configurations), then the sample outside the sample reservoir 106 is wasted and cannot be used for a reanalysis if analysis results of the sample are questionable, or if the laboratory otherwise requires reanalysis of the sample to verify the results.

Figure 3A:
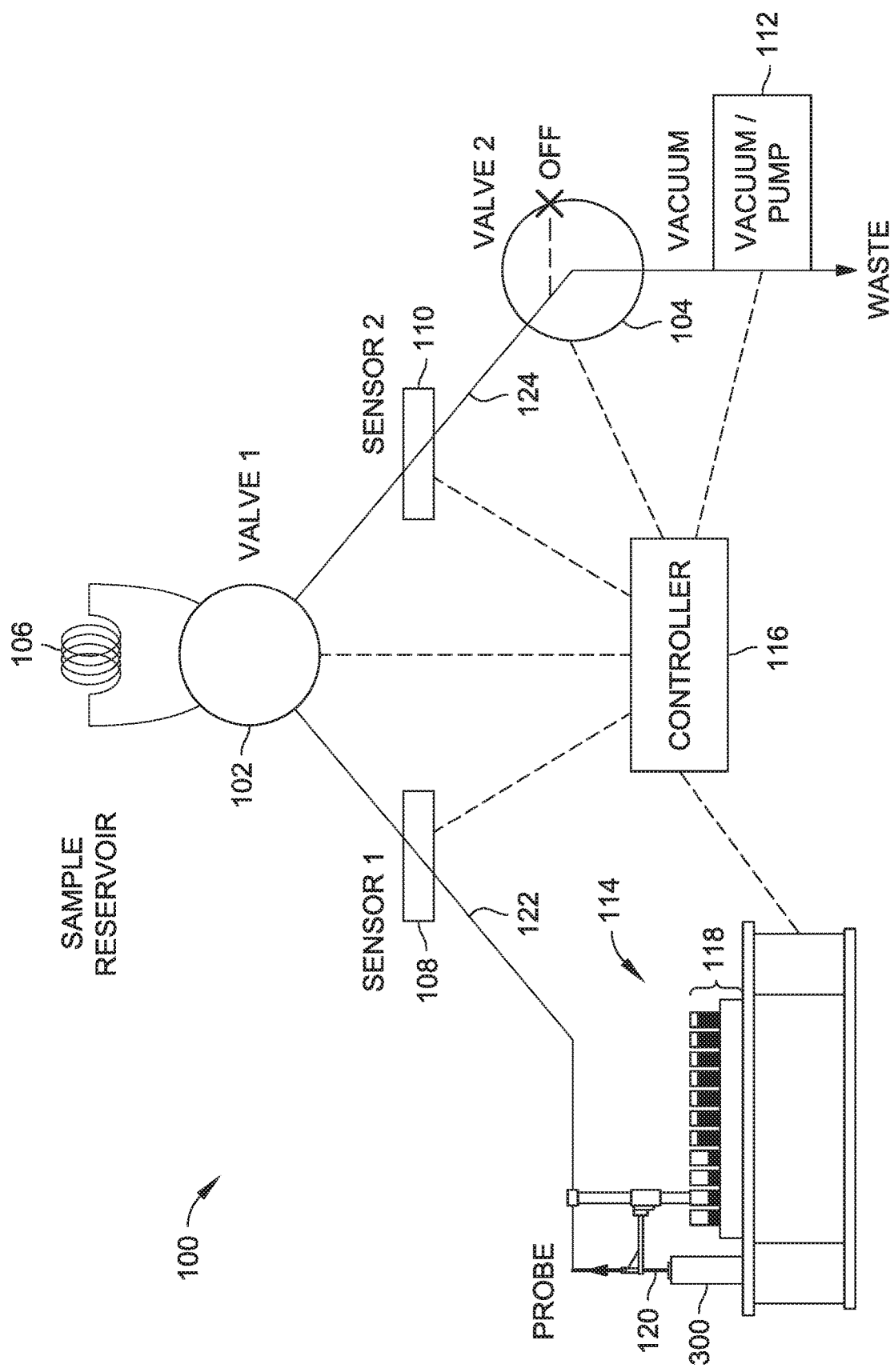
FIG. 3A is a diagrammatic illustration of the system of FIG. 1 with a rinse fluid being drawn through an autosampler probe during analysis of the previously-drawn sample.
Figure 3B:
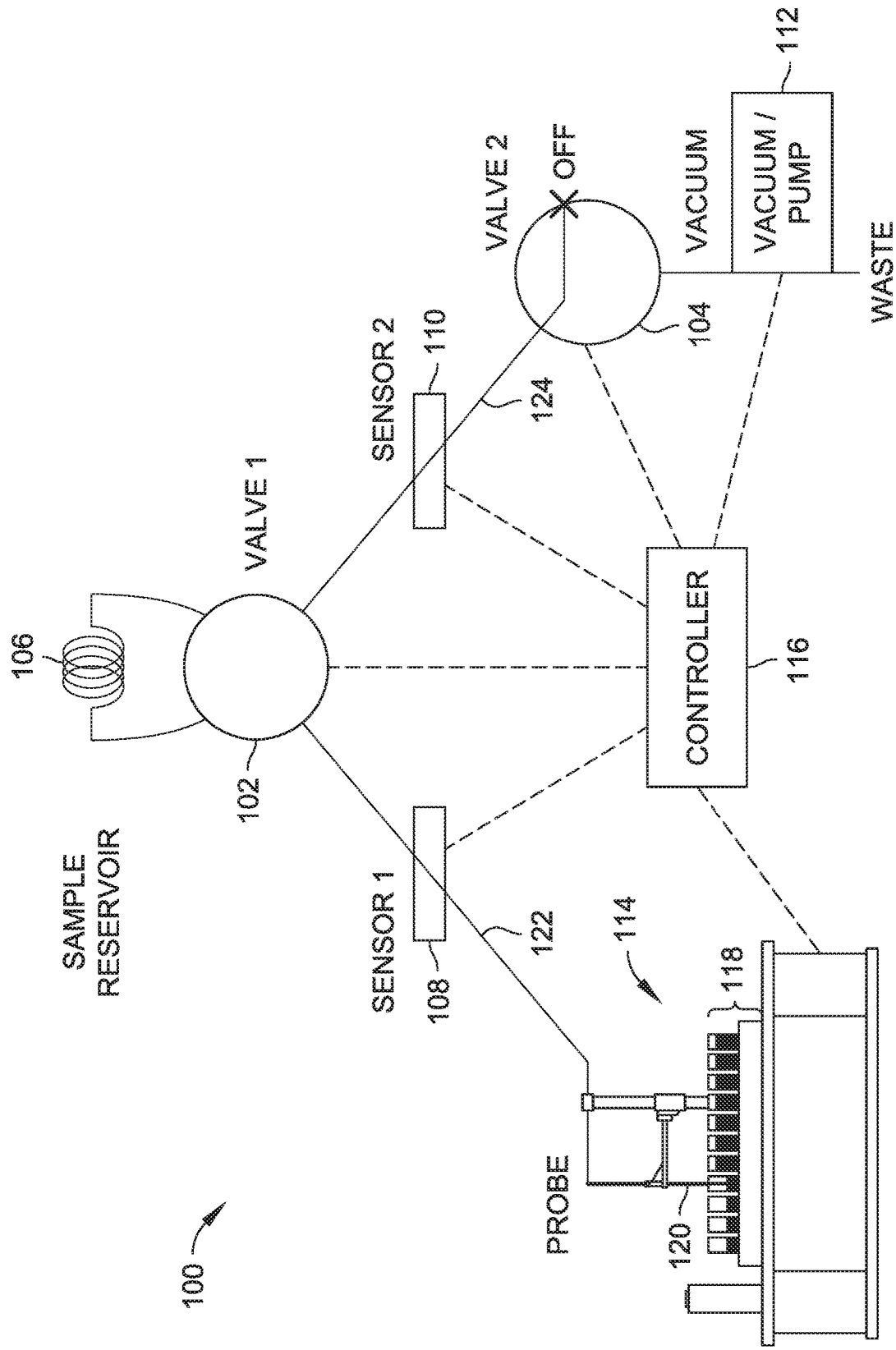
FIG. 3B is a diagrammatic illustration of the system of FIG. 3A with the rinse fluid held in the autosampler probe.
Figure 3C:
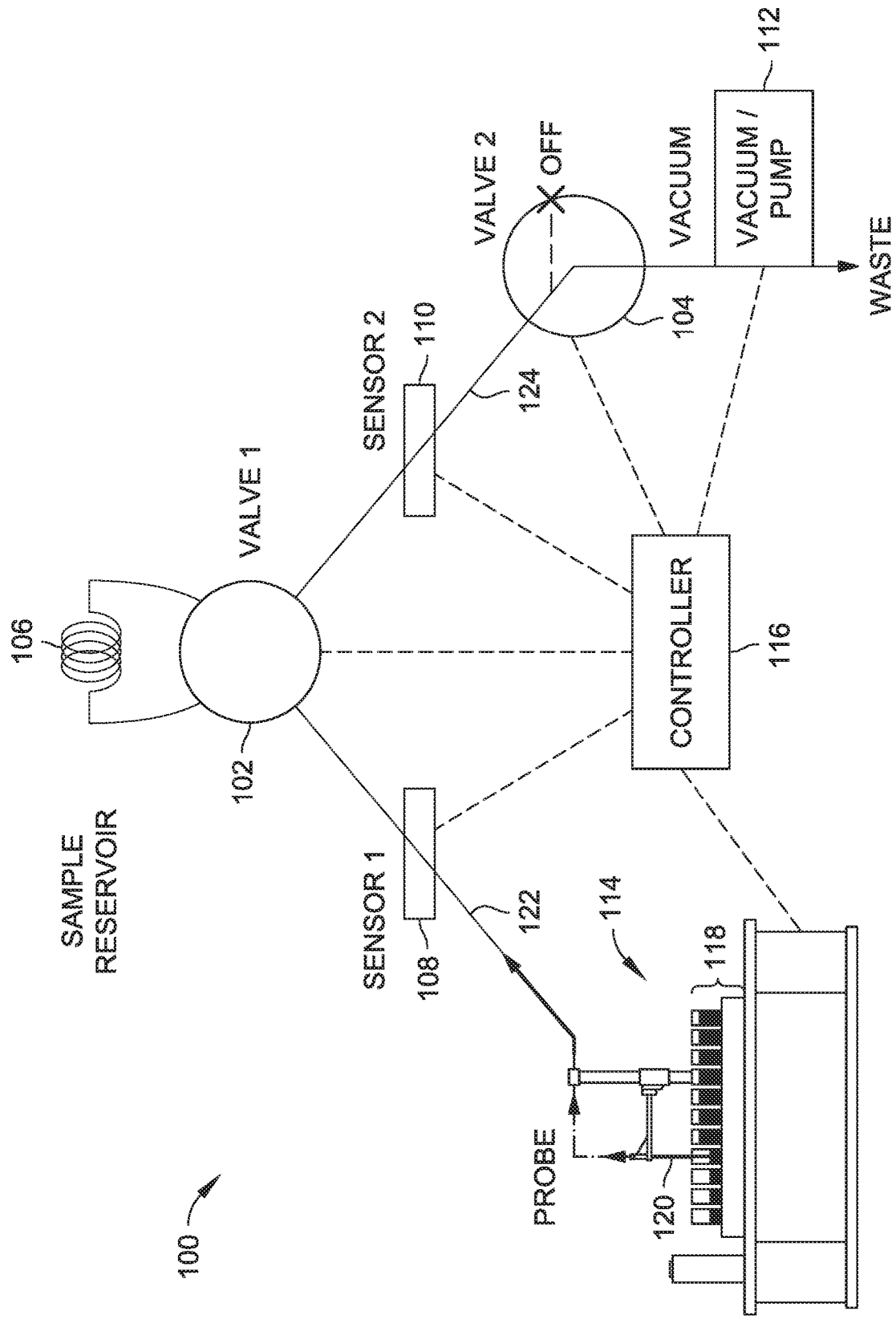
FIG. 3C is a diagrammatic illustration of the system of FIG. 3B with a sample fluid being drawn through the autosampler probe with the rinse fluid and the sample fluid directed toward the injection valve.
Figure 3D:
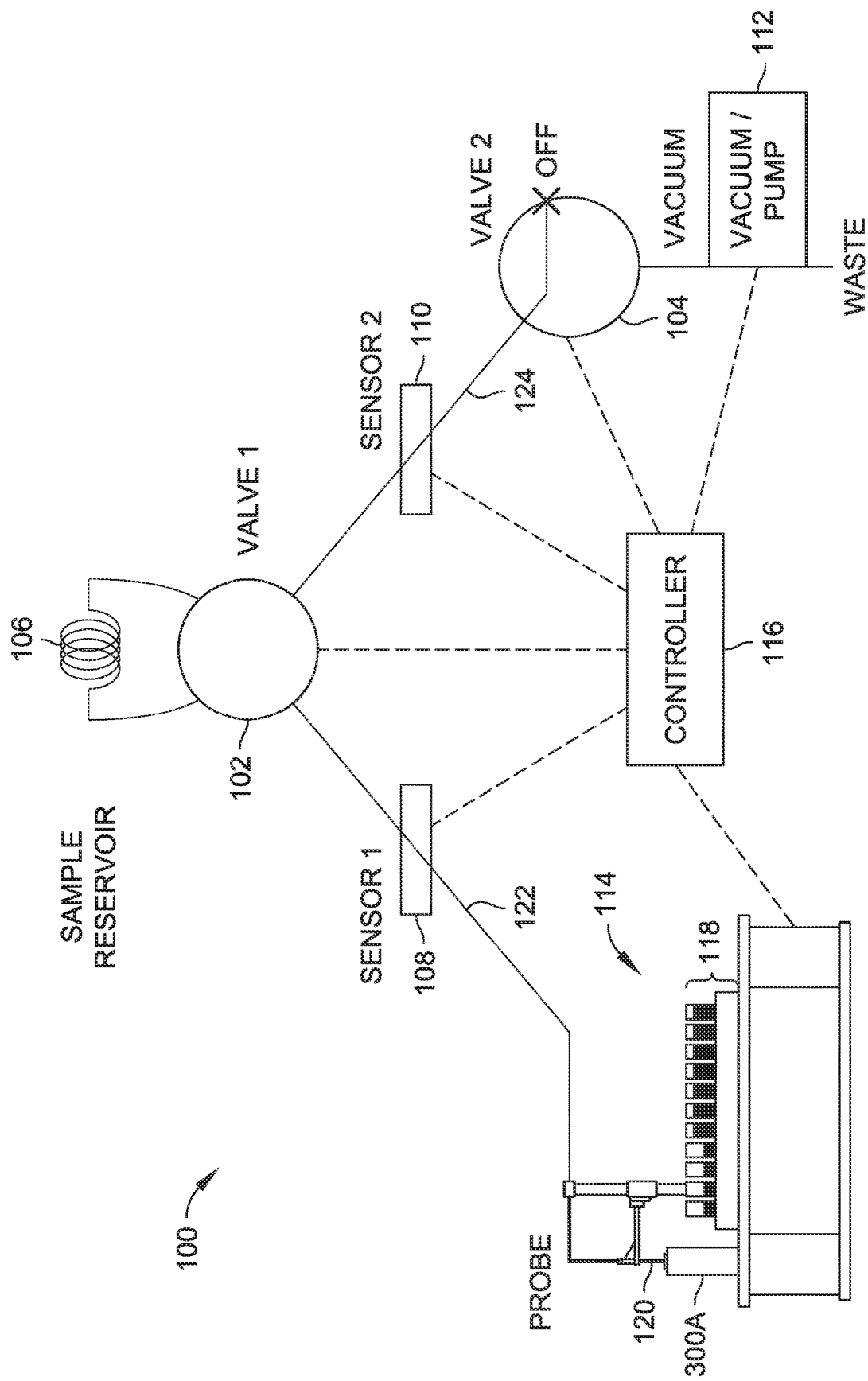
FIG. 3D is a diagrammatic illustration of the system of FIG. 3A with the rinse fluid held in the autosampler probe, with the autosampler probe held above a second rinse fluid container.
Figure 3E:
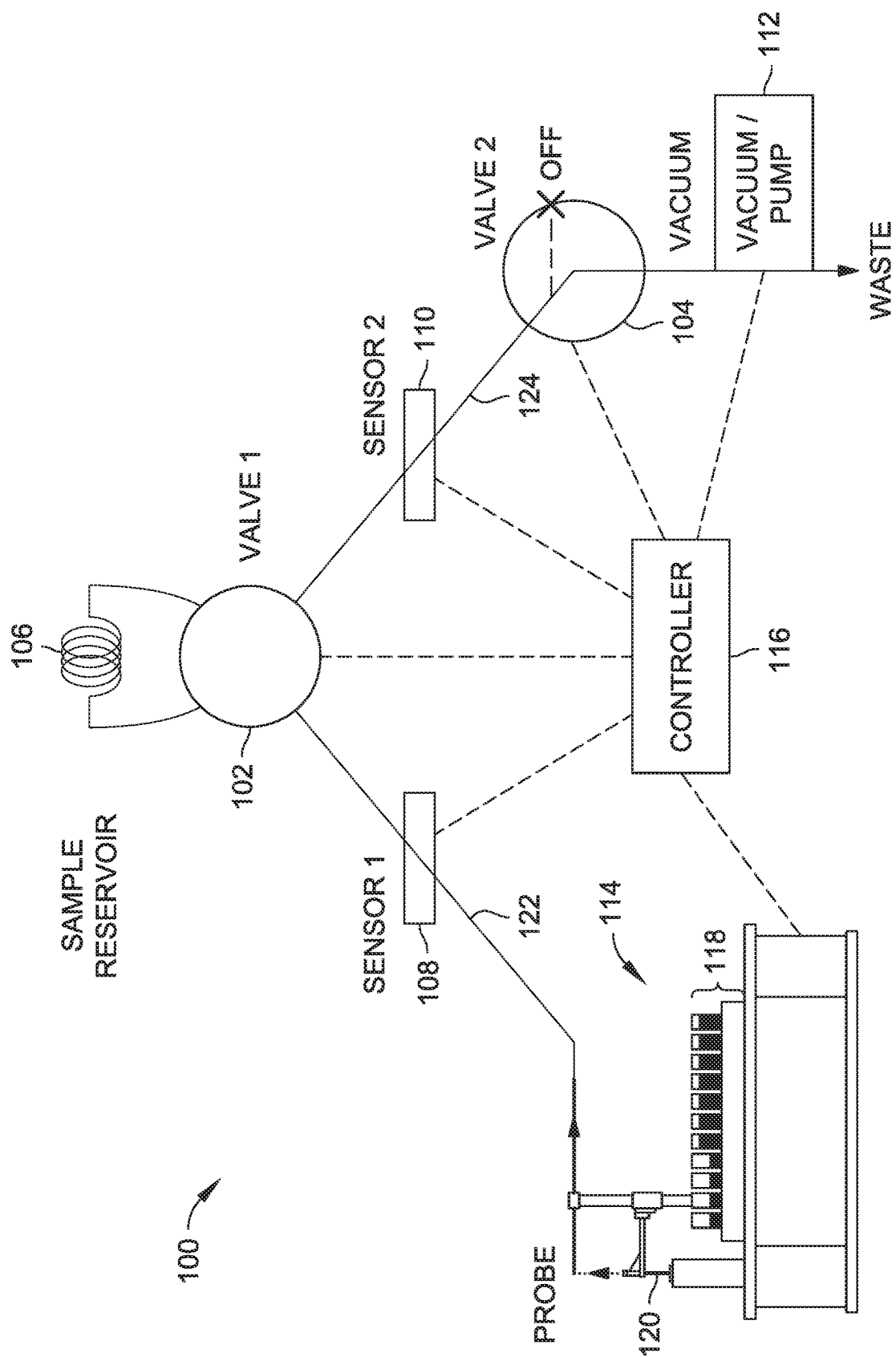
FIG. 3E is a diagrammatic illustration of the system of FIG. 3A with the rinse fluid held in the autosampler probe with a second rinse fluid being drawn through the autosampler probe with the rinse fluid and the second rinse fluid directed toward the injection valve.
Figure 4:
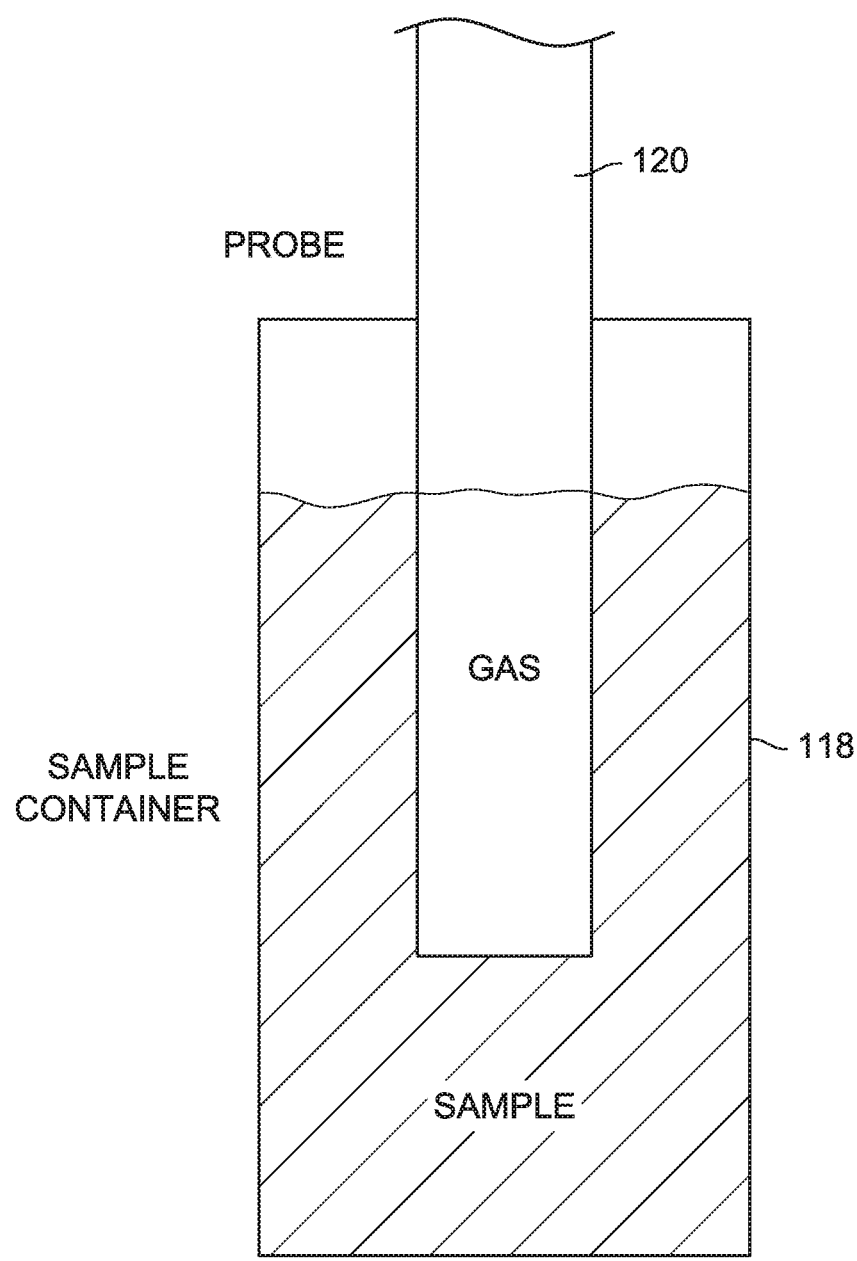
FIG. 4 is a diagrammatic illustration of a sample probe of an autosampler introduced to a sample container containing a sample, where the sample probe holds a gas within the sample probe.

The system 100 can trap a rinse liquid at the valve 102 to facilitate rapid cleaning protocols between samples and to reduce the amount of rinse liquid needed as compared to traditional sampling procedures. For example, referring to FIGS. 3A and 3E one or more rinse fluids can be transferred through the system 100 during cleaning protocols of the system 100. FIG. 3A shows the system 100 introducing a rinse fluid from a rinse container 300 into the probe 120 through operation of the autosampler 114 (e.g., in fluid communication with the vacuum source 112). The introduction of rinse fluid into the probe 120 can occur during analysis of a previous sample withdrawn by the probe 120. The system 100 then blocks the vacuum applied to the transfer line 122 (e.g., by switching the valve 104 to the blocked configuration) to trap the rinse fluid within the probe 120. In implementations, the sensor 108 detects the presence of the rinse fluid in the transfer line 122 and triggers the valve 104 to the blocked configuration. The autosampler 114 then withdraws the probe 120 from the rinse container 300 maintaining the rinse fluid within the probe 120. In implementations, the autosampler 114 moves the probe 120 to a position above the next sample to be analyzed within the plurality of sample containers 118 (e.g., as shown in FIG. 3B). By prepositioning the probe 120 containing the rinse fluid above the next sample to be analyzed, the system 100 saves the transit time required to rinse and move the probe 120 following analysis of the previous sample, allowing the next sample to immediately be drawn into the system 100 after analysis while also rinsing the transfer line 122, the sample reservoir 106, etc. The system 100 can then withdraw the next sample to be analyzed and transfer the sample to the sample reservoir 106 as described herein. The rinse fluid trapped in the probe 120 will precede the sample within the transfer line 122 to rinse the transfer line 122 and other portions of the system 100 prior to passage by the sample (e.g., as shown in FIG. 3C). In implementations, additional rinse fluids can be drawn into the system prior to withdrawal of the next sample for analysis, such as for sample procedures that require multiple rinse fluids (e.g., a first rinse fluid to remove biological components followed by a second rinse fluid to remove metallic components, a first basic pH rinse fluid followed by a second acidic pH rinse fluid, a first acidic pH rinse fluid followed by a second water rinse, etc.). For example, FIG. 3D shows the probe 120 positioned above another rinse container 300A containing a second rinse fluid with the probe 120 containing a rinse fluid withdrawn from rinse container 300 trapped within the probe 120 (e.g., as described with respect to FIGS. 3A and 3B). The introduction of the first rinse fluid into the probe 120 can occur during analysis of a previous sample withdrawn by the probe 120, captured by the sample reservoir 106 and transferred to an analysis system in fluid communication with the valve 102. The autosampler 114 moves the probe 120 above or at the rinse container 300A such that when the analysis of the previous sample is completed, the system 100 can then withdraw the second rinse fluid from the rinse container 300A (e.g., by changing the valve 104 to the first flow configuration to permit the vacuum to draw the second rinse fluid into the probe 120, shown in FIG. 3E). By prepositioning the probe 120 containing the rinse fluid above the rinse container 300A to be analyzed, the system 100 saves the transit time required to transition between two rinse containers following analysis of the previous sample, allowing two rinse fluids to immediately be drawn into the system 100 after analysis, providing improved throughput of sample analysis.

The system 100 can also facilitate preventing pre-sampling of a fluid while the probe 120 is introduced to a fluid container (e.g., sample container 118, rinse container 300 or 300A, etc.). For example, referring to FIG. 4, the probe 120 is shown introduced to sample container 118. Prior to introducing the probe 120 to the sample container 118, the system 100 draws gas (e.g., ambient air) into the probe 120, such as through action of the vacuum source 112 and then traps the gas within the probe 120, such as by blocking action of the vacuum as described herein. The autosampler 114 can then introduce the probe 120 to the sample container 118. The gas within the probe 120 prevents the next sample from being drawn into the transfer line 122 until the vacuum source 112 is brought into fluid communication with the probe 120 (e.g., by transitioning the valve 104 to the first flow configuration). This pre-sampling prevention can be utilized, for example, in scenarios where no rinse procedures are utilized between successive samples. Once a sample is drawn into the system 100, the probe 120 can be removed from the sample container 118 to draw and trap air in the probe 120. The autosampler 114 can then move to the next sample to be analyzed during analysis of the previous sample and introduce the probe 120 into the next sample container 118. The next sample is then ready for immediate sampling following analysis of the previous sample, preventing the need to transition the probe 120 to the next sample location, while preventing waste of liquid within the sample container 118.

In implementations, the system 100 maintains power on the vacuum source 112 to maintain pumping speed of the vacuum source at a speed used to withdraw the samples from the sample containers 118, even when the valve 104 is in a closed position (e.g., preventing fluid access to or from the vacuum source 112). When the probe 120 is positioned at the next sample or otherwise in a ready state to withdraw sample or other fluid, the valve 104 is transitioned to an open position to immediately allow the vacuum source 112 to apply the vacuum to the fluid line 124 to move fluid through the valve 102.

In implementations, the system 100 can reduce the time taken to process a sample in an example sample methodology by an average of about 5 second to about 10 seconds as compared to traditional sample processing procedures. For laboratory facilities handling hundreds of samples, the system 100 can improve throughput on the order of hours in a given day.

The system 100 can automatically manage introduction of samples from the plurality of sample sources 118 to the sample reservoir 106 and subsequently to an analysis instrument through operation of the controller 116, which can be part of a computing device having a processor and memory. The processor provides processing functionality for the computing device and may include any number of processors, micro-controllers, controller 116, or other processing systems, and resident or external memory for storing data and other information accessed or generated by the computing device. The processor may execute one or more software programs that implement the techniques described herein. The processor is not limited by the materials from which it is formed or the processing mechanisms employed therein and, as such, may be implemented via semiconductor (s) and/or transistors (e.g., electronic integrated circuits (ICs)), and so forth.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for capturing fluid within a fluid reservoir, comprising:
   introducing a sample probe into a sample container containing a fluid sample;
   fluidically coupling a vacuum source to the sample probe to draw the fluid sample from the sample container into the sample probe and introduce the fluid sample to a fluid transfer line coupled with the sample probe;
   directing the fluid sample from the fluid transfer line to a sample reservoir fluidically coupled with a valve;
   detecting, via one or more sensors, a presence of the fluid sample at least one of prior to introduction of the fluid sample from the fluid transfer line to the sample reservoir or subsequent to the fluid sample exiting from the sample reservoir via the valve;
   generating one or more sense signals responsive to detecting the presence of the fluid sample via the one or more sensors;
   transmitting the one or more sense signals to a controller responsive to detecting the presence of the fluid sample via the one or more sensors;
   decoupling fluid communication between the vacuum source and the sample probe via control by the controller responsive to detecting the presence of the fluid sample via the one or more sensors to capture the fluid sample within the sample reservoir;
   transferring one or more control signals from the controller to an autosampler manipulating the sample probe responsive to detecting the presence of the fluid sample via the one or more sensors; and
   removing the sample probe from the sample container via the autosampler responsive to receipt of the one or more control signals by the autosampler.

2. The method of claim 1, wherein detecting, via one or more sensors, a presence of the fluid sample at least one of prior to introduction of the fluid sample from the fluid transfer line to the sample reservoir or following exiting of the fluid sample from the sample reservoir includes:
   detecting the presence of the fluid sample following exiting of the fluid sample from the sample reservoir.

3. The method of claim 1, wherein detecting, via one or more sensors, a presence of the fluid sample includes:
   detecting, via one or more sensors, a leading edge of the fluid sample.

4. The method of claim 1, wherein decoupling fluid communication between the vacuum source and the sample probe via control by the controller includes:
   transmitting one or more control signals from the controller to a second valve in fluid communication with the vacuum source to change the configuration of the second valve from a first fluid flow configuration that permits fluid communication between the vacuum source and the sample probe to a second fluid flow configuration that blocks fluid communication between the vacuum source and the sample probe.

5. The method of claim 1, wherein the one or more sensors include at least one of an optical sensor, a pressure sensor, an ultrasonic transducer, or a conductivity sensor.

6. The method of claim 1, further comprising:
   transferring the fluid sample from the sample reservoir to an analytic instrument.

7. The method of claim 1, wherein directing the fluid sample from the fluid transfer line to a sample reservoir fluidically coupled with a valve includes:
   directing not more than one milliliter of the fluid sample from the fluid transfer line to the sample reservoir fluidically coupled with the valve.

8. The method of claim 1, wherein decoupling fluid communication between the vacuum source and the sample probe via control by the controller includes:
   transmitting one or more control signals from the controller to a power source of the vacuum source to stop operation of the vacuum source.

9. The method of claim 8, wherein the vacuum source includes a valve that biases to a closed position upon loss of power to the vacuum source to prevent access to a fluid outlet by the vacuum source.

10. A method for capturing fluid within a fluid reservoir, comprising:
    introducing a sample probe into a sample container containing a fluid sample;
    fluidically coupling a vacuum source to the sample probe to draw the fluid sample from the sample container into the sample probe and introduce the fluid sample to a fluid transfer line coupled with the sample probe;

directing the fluid sample from the fluid transfer line to a sample reservoir fluidically coupled with a valve;

detecting, via one or more sensors, a presence of the fluid sample at least one of prior to introduction of the fluid sample from the fluid transfer line to the sample reservoir or subsequent to the fluid sample exiting from the sample reservoir via the valve;

generating one or more sense signals responsive to detecting the presence of the fluid sample via the one or more sensors;

transmitting the one or more sense signals to a controller responsive to detecting the presence of the fluid sample via the one or more sensors;

decoupling fluid communication between the vacuum source and the sample probe via control by the controller responsive to detecting the presence of the fluid sample via the one or more sensors to capture the fluid sample within the sample reservoir; and removing the sample probe from the sample container prior to decoupling fluid communication between the vacuum source and the sample probe.

11. The method of claim 10, further comprising:

drawing gas within the sample probe via action of the vacuum source prior to decoupling fluid communication between the vacuum source and the sample probe, wherein decoupling fluid communication between the vacuum source and the sample probe traps the gas within the sample probe.

12. The method of claim 11, further comprising transferring the fluid sample from the sample reservoir to an analytic instrument for analysis.

13. The method of claim 12, further comprising:

positioning the sample probe having the gas trapped therein within a second sample container containing a second fluid sample during analysis of the fluid sample by the analytic instrument.

14. A system comprising:

a valve system including a first valve in fluid communication with a sample reservoir;

a sensor system configured to detect presence or absence of a fluid at the first valve; and a controller configured to block fluid access of a vacuum applied by a vacuum source to the first valve upon detection of the fluid at the first valve via the sensor system to isolate the fluid within the sample reservoir, wherein the controller is configured to control a power supply to the vacuum source, and wherein the controller is configured to stop operation of the vacuum source upon detection of the fluid at the first valve.

15. The system of claim 14, further comprising a second valve configured to permit and block fluid access of the vacuum source to the first valve.

16. The system of claim 14, wherein the vacuum source includes a second valve configured to block fluid access of the vacuum source to the first valve responsive to the controller stopping operation of the vacuum source upon detection of the fluid at the first valve.

17. The system of claim 14, wherein the sample reservoir includes a fluid inlet and a fluid outlet, and wherein each of the fluid inlet and the fluid outlet is coupled with the first valve.

18. A system comprising:

a valve system including a first valve in fluid communication with a sample reservoir;

a sensor system configured to detect presence or absence of a fluid at the first valve;

a controller configured to block fluid access of a vacuum applied by a vacuum source to the first valve upon detection of the fluid at the first valve via the sensor system to isolate the fluid within the sample reservoir; and a fluid line coupled between the first valve and the vacuum source, wherein the sensor system includes a sensor to detect presence or absence of the fluid in the fluid line coupled between the first valve and the vacuum source.

\* \* \* \* \*